July 19, 1949.  C. G. HOLSCHUH ET AL  2,476,300
SIGHTING STATION FOR REMOTE AIRCRAFT TURRET CONTROL
Filed Nov. 22, 1941  3 Sheets-Sheet 1

INVENTORS,
CARL G. HOLSCHUH,
and DAVID FRAM;
BY
their ATTORNEY

July 19, 1949. C. G. HOLSCHUH ET AL 2,476,300
SIGHTING STATION FOR REMOTE AIRCRAFT TURRET CONTROL
Filed Nov. 22, 1941 3 Sheets-Sheet 2
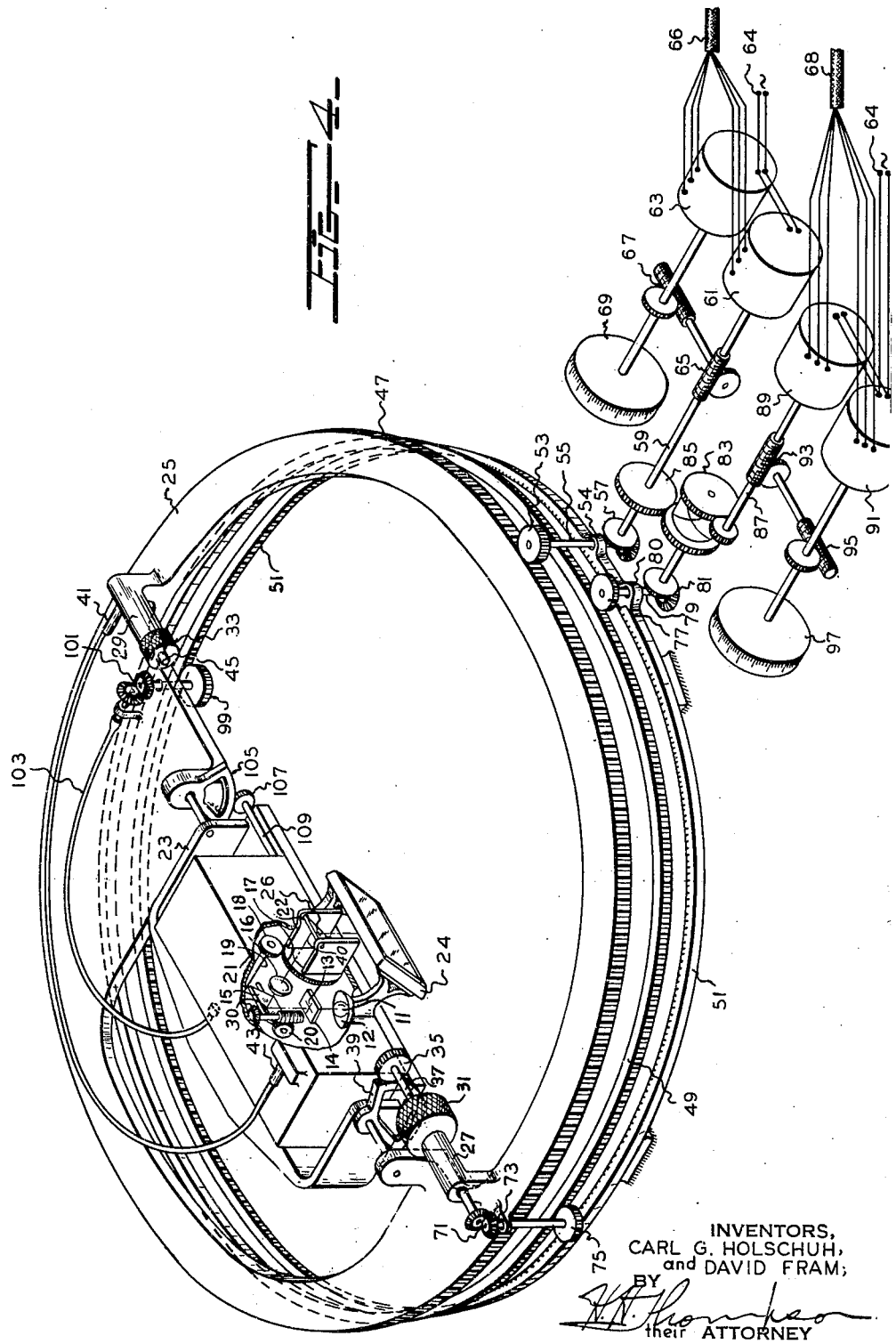
INVENTORS,
CARL G. HOLSCHUH,
and DAVID FRAM;
BY
their ATTORNEY

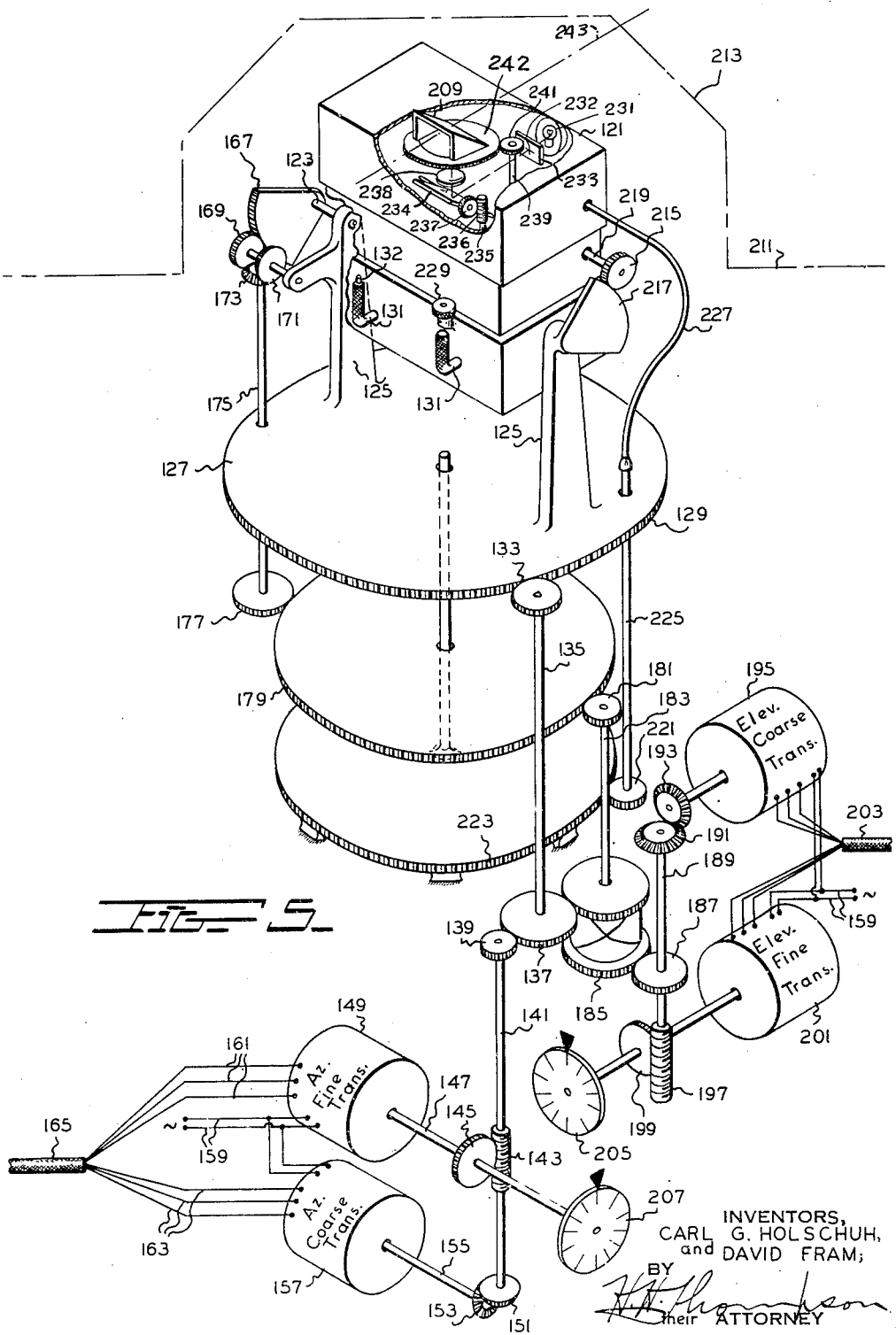

Patented July 19, 1949

2,476,300

UNITED STATES PATENT OFFICE 2,476,300

SIGHTING STATION FOR REMOTE AIRCRAFT TURRET CONTROL

Carl G. Holschuh, Wood-Ridge, N. J., and David Fram, Brooklyn, N. Y., assignors to The Sperry Corporation, a corporation of Delaware Application November 22, 1941, Serial No. 420,044

11 Claims. (Cl. 33—49)

The present invention is concerned with sighting stations for controlling remote power operated devices, such as gun turrets for aircraft.

Up to the present time, aircraft armament has been fixed, manually controlled, or power-operated directly by a gunner located at the gun position. Requirements for effective defense of aircraft usually necessitate the positioning of guns and turrets at points remote from and inaccessible to the crew, such as in the tail or in the wings of the craft. Further requirements of stability and weight distribution generally prevent the locating of gunners at these remote positions.

By the present invention it is possible to locate power-operated guns and turrets at any desired positions on the aircraft and to control these guns and turrets from any other desired point, such as a fire control position which may be located within the cabin or at a special fire control point suitable for convenient and accurate sighting of targets.

The present invention is concerned with providing sighting stations for these remote turrets which will provide the driving mechanism of the turrets with control data suitable for controlling the directing and firing of the guns at the future position of the target, making proper allowances for the necessary ballistic and prediction corrections.

A suitable driving mechanism for actuating the remote guns and turrets under control of the present invention is shown in copending application Serial No. 417,580, for Remote aircraft turret control mechanism, filed November 1, 1941, in the name of W. C. Hartman, J. A. Peoples, Jr., and H. L. Hull, and in copending application Serial No. 424,612, for Hydraulic remote operating system filed December 27, 1941, in the name of E. Dawson, F. M. Watkins and C. N. Schuh, now Patent 2,445,765, granted July 27, 1948. A suitable construction for such turrets is shown in copending application Serial No. 416,290 for Power operated aircraft gun turrets, filed October 24, 1941, in the name of C. G. Holschuh and L. C. Warner, now Patent 2,434,653, granted January 20, 1948.

Accordingly, it is an object of the present invention to provide improved sighting stations for controlling the orientation of remote power operated devices.

It is a further object of the present invention to provide a convenient and useful mounting for a gun sight and computing unit which is especially adapted for the sighting and tracking of targets from aircraft.

It is a still further object of the present invention to provide improved control for aircraft sighting stations.

It is another object of the present invention to provide improved means for transmitting aircraft gun-directing data to a remotely situated gun.

Other objects and advantages of the present invention will become apparent from examination of the following specification and drawings, wherein the present invention is embodied in concrete form.

Referring to the drawings,

Fig. 4 shows a schematic perspective representation of the mechanism of the lower sighting station of Figs. 2 and 3.

Fig. 5 shows a similar schematic perspective representation of an upper sighting station.

Figure 1:
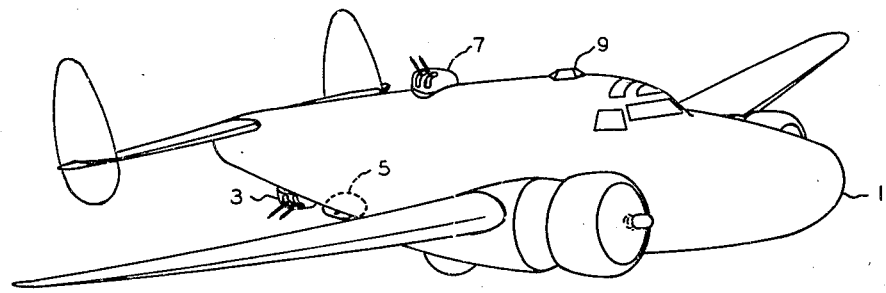
Fig. 1 shows a perspective representation of a craft showing possible locations of the sighting stations of the present invention.

Referring to Fig. 1, reference numeral 1 indicates an aircraft suitable for carrying the remote-operated turrets and the sighting stations of the present invention. Shown on this craft 1 is a lower gun turret 3 adapted to be controlled from a sighting station 5 located at the bottom of the fuselage of craft 1. A second turret 7 located at the upper part of the fuselage is adapted to be controlled from a sighting station 9 remote therefrom.

It is to be noted that these sighting stations 5 and 9 may be located at any position of the aircraft suitable for sighting and tracking a target.

Figure 2:
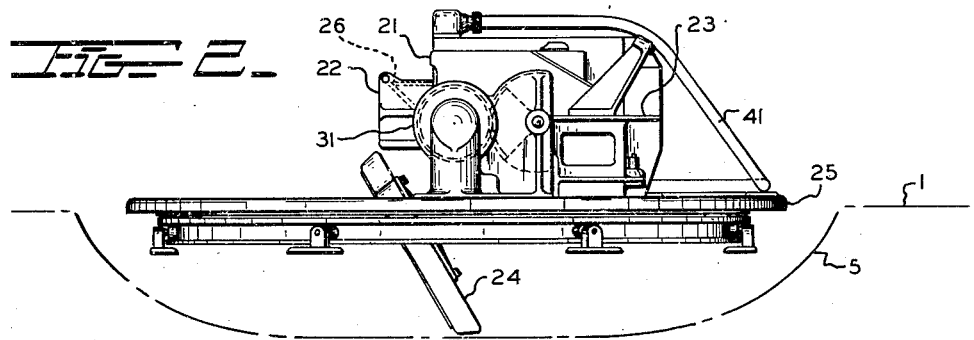
Fig. 2 shows an elevation view of a lower sighting station of the present invention.
Figure 3:
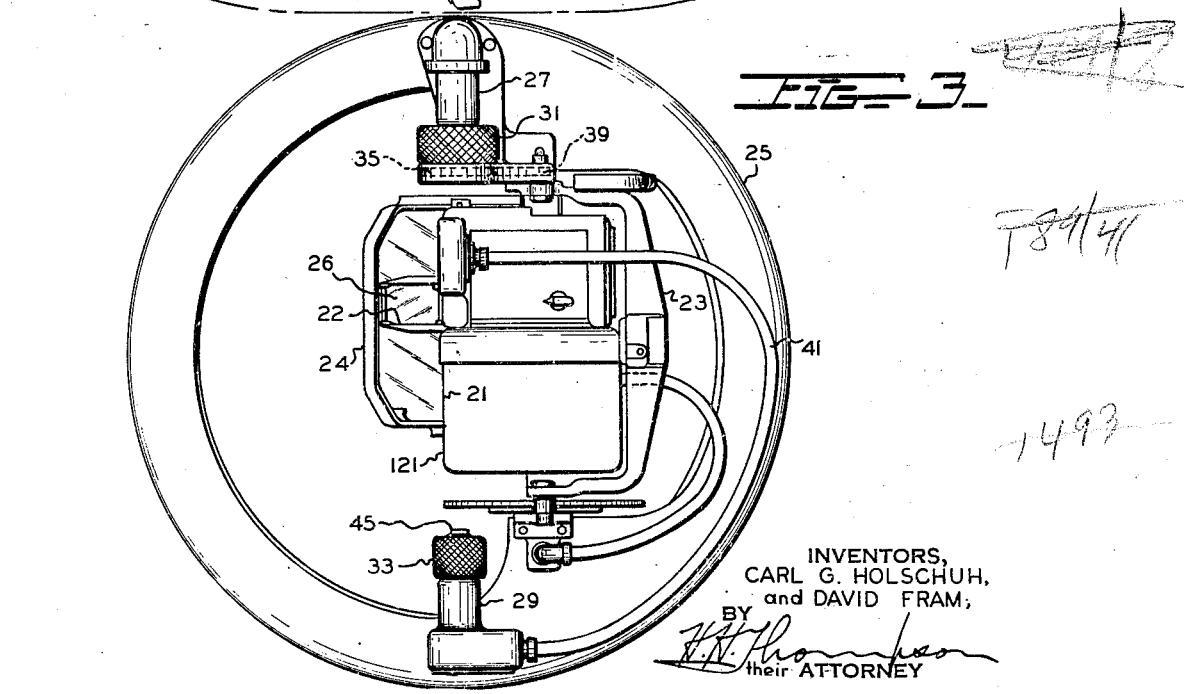
Fig. 3 shows a plan view of the sighting station of Fig. 2.

Referring to Figs. 2–4, the sight computer 21 having viewing optic 22 is fixedly mounted in a cradle 23, which, in turn, is pivotally mounted diametrically on a platform 25 rotatably mounted, in this instance, horizontally in the aircraft. Secured to sight computer 21 is a mirror 24 which serves to reflect the image of the target into a reflex mirror 26 within optic 22, where the target image is superposed on a range finding reticle or image, as described in copending application Serial No. 358,382, for Computing aircraft gun sight, filed September 26, 1940, in the names of C. G. Holschuh and O. A. Vielehr, now Patent 2,396,701, granted March 19, 1946, wherein is described a suitable form of computing sight 21. Another example of a suitable computing gun sight is disclosed in U. S. Patent 2,206,875 issued on July 9, 1940, to E. W. Chafee and B. A. Wittkuhns.

As is described in the above mentioned application Serial No. 358,382, computing sight 21 is of the type wherein light from a source 11 is directed as by reflector 12 through a slot 13 in a mask 14 onto a pivotally mounted elevation reflector 15. The slot 13 may be of any desired shape such as a cross or include movable stadia lines for range finding purpose. Light passing through the slot is reflected by the reflector 15 through an objective lens 16, which focuses an image of the slot 13 at infinity, and then to rotatably mounted optic 26 which is a transparent deflector such as a reflex mirror. The optic 26 is mounted on a ring gear 17 that meshes with a spur gear 18 on shaft 19 which is rotated by a computing mechanism according to the azimuth component of the lead angle. The elevation reflector 15 may be turned by a worm gear and worm wheel 20 from shaft 30 that is rotated by a computing mechanism according to the elevation lead angle.

In this manner, the line of sight from optic 26, as represented by dot-dash line 40, is offset in elevation and azimuth according to a computed lead angle. As will be described, the computing mechanism is supplied with data corresponding to the azimuth and elevation position of the gun sight, which corresponds to the azimuth and elevation position of the gun, as well as the range of the target. The computing mechanism determines ballistic and prediction corrections which are inserted optically, so that, with the target image centered upon the range image, the position of the sight corresponds to the proper gun orientation for directing a projectile at the future position where projectile and target would meet.

Hence, the sight 21 is adapted to be rotated in azimuth together with platform 25 and in elevation with its cradle 23. For the purpose of rotating sight 21 and platform 25 in azimuth, two diametrically opposed radially extending hand grips 27 and 29 are provided fastened to platform 25. Each of these hand grips contains at its end a concentricly disposed knob 31 or 33, respectively, each rotatable with respect to its corresponding hand grip 27 or 29. Knob 31 is adapted to rotate the sight in elevation as by means of a pinion 35 fixed to knob 31 by a shaft 37, which pinion 35 is adapted to rotate a gear sector 39 fixed to the sight cradle 23. Knob 33 is provided for the purpose of adjusting the range control of the sight-computer 21 and for this purpose is suitably coupled to a flexible shaft 41, which connects knob 33 to sight 21 through a coupling 43. Range control knob 33 may carry at its end a fire control key 45 adapted to be operated by the thumb of the gunner, which closes the control circuit for the gun firing mechanism (not shown).

Platform 25 is rotatably mounted in the aircraft and carries gear teeth 47 at its outer periphery. Coaxially mounted with platform 25 is a floating elevation gear ring 49, also carrying teeth at its outer periphery, and an internal gear 51 fixed to the craft. Meshing with the gear 47 is a pinion 53 rotatably supported in a bracket 54 fixed to the craft, which pinion operates through a shaft 55, gearing 57, and shaft 59 to turn the "coarse" and "fine" azimuth remote position transmitters 61 and 63, which are maintained in fixed ratio of rotation by worm and worm wheel arrangements 65 and 67. These transmitters may be of the well-known "Selsyn" or "Autosyn" type, having rotors energized by alternating current from a suitable source 64, and having stators connected as by cable 66 to the corresponding receivers or repeaters at the remotely situated gun driving mechanism shown in copending applications Serial No. 417,580 and Serial No. 424,612.

Thus, it will be clear that, upon rotation of platform 25 in azimuth, pinion 53 will be rotated by gear 47 and will thereby rotate azimuth transmitters 61 and 63. An azimuth indicator 69 may be directly coupled to transmitters 61 and 63 and thereby indicate to the gunner the azimuth of the gun orientation.

Also fixed to elevation control knob 31 is a bevel gear 71 which meshes with a second bevel gear 73 and thereby turns a pinion 75 engaging the floating elevation ring gear 49. In this manner, by turning knob 31, the elevation gear 49 is rotated relative to platform 25. Also meshing with elevation gear 49 is a pinion 77 which turns a shaft 79 pivotally mounted as in a bracket also fastened to the aircraft itself. Shaft 79 operates through gearing 81 to turn one member of differential 83. A second member of differential 83 is turned by shaft 59 by means of a gear 85. The output from the third member of differential 83 rotates a shaft 87 and thereby rotates the "coarse" elevation position transmitter 89. The "fine" elevation position transmitter 91 is coupled to shaft 87 by means of worm and worm wheel arrangements 93 and 95, and is also energized from source 64 and transmits its output to the remote receivers by a cable 68. An elevation indicator 97 is provided coupled to the "fine" transmitter 91.

Thus, it will be seen that rotation of elevation knob 31 will operate to rotate pinion 77 and thereby through differential 83 and the associated gearing will rotate the elevation position transmitters 89 and 91. However, even if elevation knob 31 is kept fixed, rotation of platform 25 in azimuth will also cause pinion 77 to rotate since, in this manner, gear 49 will be carried around with azimuth gear 47, thereby rotating pinion 77. Differential 83 provides a compensation for this effect by effectively providing a rotation of shaft 87 in a direction opposite to that which would be caused by the azimuth motion of platform 25 and gear 49. In this manner the rotation of shaft 87 will represent the actual rotation of sight 21 in elevation.

In order to provide computer-sight 21 with data corresponding to desired gun azimuth, which corresponds to the position of azimuth platform 25, a pinion 99 is provided carried by platform 25 and meshing with internal gear 51. Pinion 99 actuates, through gearing 101, a flexible shaft 103, whose remote end is coupled to suitable mechanism within sight 21 and thereby provides sight 21 with the gun azimuth data.

Desired gun elevation data is provided to computer-sight 21 by means of a gear sector 105 fixed to platform 25. Meshing with sector 105 is a pinion 107 mounted on a shaft 109 whose bearings are fixed to sight 21. Thus, as the sight 21 moves in elevation, pinion 107 rides along gear sector 105 and thereby rotates shaft 109 in accordance with the desired gun elevation data.

Since, as shown in above mentioned application Serial No. 358,382, the actual orientation of the sight mechanism is displaced from the line of sight by the ballistic and prediction corrections necessary for correct orientation of the gun, the position of the sight which is transmitted by azimuth transmitters 61, 63 and elevation transmitters 89 and 91 to the remote gun turret is the actual corrected gun azimuth and gun elevation corresponding to desired gun position and, also, the data supplied to the sight 21 through shafts 109 and 103 correspond to the actual gun elevation and gun azimuth.

In operation, the gunner at the sighting position normally rests in a prone position, with his eye placed above optic 22, and with his hands gripping knobs 31 and 33. The gunner manually rotates the entire sight in azimuth, and by means of elevation knob 31 adjusts it in elevation until the target is seen in optic 22. Range knob 33 is adjusted until the range stadia lines described in application Serial No. 358,382 just circumscribe the target. With target centered and range finder adjusted, the elevation and azimuth transmitters will then transmit the proper gun orienting control data to the remote gun turret or turrets, and pressing firing key 45 will fire the guns at the position where projectile and target will meet in space.

Fig. 5 shows a schematic representation of an upper sighting station whose construction and mechanism is generally similar to that of the lower sighting station shown in Fig. 4. Thus, sight 121 is pivotally mounted about a horizontal axis 123 rotatably secured in brackets 125 fastened at diametrically disposed points of a rotatable azimuth platform 127 carrying gear teeth 129 at its outer periphery. Sight 121 is adapted to be rotated in azimuth directly by the gunner or fire control officer by means of vertically extending hand-grips 131 which may carry a firing key 132 at one end. Rotation of sight 121 in azimuth by means of these hand-grips 131 causes the rotation of azimuth platform 127, thereby rotating a pinion 133 engaging azimuth gear 129.

Pinion 133 is carried by a shaft 135 whose bearings, not shown, are fixed to the craft. Therefore, rotation of shaft 135 will serve to rotate gear 137, gear 139, shaft 141, worm 143, worm wheel 145, and shaft 147, which is connected to the rotor of a "fine" position transmitter 149.

Also connected to shaft 141 and rotated thereby are bevel gears 151 and 153 thereby rotating a shaft 155 connected to the rotor of a "coarse" position transmitter 157. In accordance with well known practice, the rotors of position transmitters 149 and 157 are energized by alternating current from a suitable source 159 and the outputs from their stators, derived from wires 161 and 163, are connected as by cable 165 to the corresponding receivers or repeaters at the remotely situated gun actuating apparatus shown in copending applications Serial Nos. 417,580 and 424,612.

Connected to the horizontal pivotal axis 123 of sight 121 is an elevation gear sector 167. Rotation of sight 121 about axis 123 by means of manual actuation of hand-grips 131 will cause rotation of a pinion 169 engaging gear sector 167 and thereby rotating bevel gears 171 and 173, and a shaft 175, whose bearings are fixed to azimuth platform 127. Shaft 175 rotates a pinion 177 which engages an elevation gear 179 concentric with azimuth platform 127 and rotatably supported with respect to azimuth platform 127.

Also engaging with elevation gear 179 is a pinion 181 fixed to a shaft 183 whose bearings are fixed to the craft. Therefore rotation of sight 121 in elevation will cause rotation of shaft 183 and thereby serves to rotate on element of a differential 185 connected to shaft 183. A second element of differential 185 is rotated by means of gear 137 controlled by the azimuth rotation of sight 121. The output of differential 185 actuates a pinion 187 and thereby rotates a shaft 189 which, through bevel gears 191 and 193, rotates the rotor of a "coarse" elevation transmitter 195. Shaft 189 also rotates worm 197 and worm wheel 199, thereby rotating the rotor of "fine" elevation transmitter 201. Transmitters 195 and 201 are also energized from the same source of alternating current 159 and their outputs are fed to the remote gun actuating mechanism as by a cable 203. An elevation indicator 205 and an azimuth indicator 207 may also be provided.

Differential 185 acts to compensate the elevation data transmitted for the azimuth motion of sight 121. Thus, it will be seen that rotation of sight 121 in azimuth will cause gear 177 to rotate elevation gear 179, which would thereby transmit data corresponding to a change in elevation to the remote gun mechanism unless otherwise compensated. Such compensation is provided by differential 185, which, by means of pinion 137 controlled from the azimuth motion of sight 121, causes an equal and opposite rotation of the output of differential 185 thereby maintaining gear 187 and shaft 189 stationary unless a change in elevation of the sight 121 actually occurs.

Gun elevation data are transmitted to the mechanism of sight 121 by means of a pinion 215 carried by a shaft 219 journaled in sight box 121. Pinion 215 rides about a gear sector 217 fixed to bracket 125 about which sight 121 pivots in elevation, and thereby serves to transmit gun elevation data to the sight 121.

Gun azimuth data is transmitted to the sight 121 by means of a pinion 221 which engages a ring gear 223 fixed to the craft and thereby rotates a shaft 225 which is connected to the sight mechanism by a flexible shaft 227.

Range data is inserted into the sight mechanism by means of a range control thumb knob 229 adapted to be actuated by the gunner's thumb.

Referring to Fig. 5, light from a source 231 is projected through a slot 232 in a mask 233. The light rays passing through the slot 232 are reflected by a pivotally mounted elevation reflector 234 that may be adjusted to introduce the elevation component of the lead angle by movement of shaft 235 that drives through worm 236 and worm wheel 237 to rotate the reflector 234. Light reflected by the elevation reflector 234 passes through an objective lens 238, which focuses an image of the slot 232 at infinity, and is then reflected by optic 209 to the eye of the observer. The azimuth component of the lead angle may be introduced by rotating shaft 239 to turn spur gear 241 that meshes with ring gear 242 which turns the optic 209.

As is explained in the above mentioned copending application, Serial No. 358,382, a suitable computing mechanism is actuated according to the azimuth and elevation position of the sight as well as the range of the target to turn shafts 239 and 235 according to azimuth and elevation components of the lead angle. In this manner a line of sight 243 is offset relative to the gun sight according to the computed lead angle.

It will be seen therefore that essentially the mechanism of Fig. 5 is quite similar to that of Fig. 4 being adapted, however, for use at the upper portion of the aircraft. Thus, the optic 209 of sight 121 projects beyond the surface 211 of craft 1 to permit sighting in all directions, at least in azimuth. The sight 121 and optic 209 may be enclosed by a transparent hood indicated schematically by dotted line 213.

In operation, the gunner stands before the sight 121, with his eye opposite the optic 209, and manually rotates the sight both in elevation and azimuth by means of hand-grips 131. At the same time he actuates the range control 229, thereby transmitting actual gun orientation data to the remote guns and turret.

By the present invention, therefore, there is provided an improved sighting station for tracking with a target which may be moving rapidly with respect to the sight, and for transmitting to a remote point data corresponding to the proper gun orientation corrected for ballistics and the future position of the target.

As many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

Having described our invention, what we claim and desire to secure by Letters Patent is:

1. A sighting station for remote aircraft gun turrets comprising a disturbed computing gun sight, a rotatable platform, means for pivotally mounting said sight upon said platform, a pair of vertically extending hand-grips fixed to said sight and adapted to directly move said sight in elevation and said platform in azimuth, a firing key positioned at the end of one of said hand grips so as to be operated by the thumb of the gunner, and means including a knob located adjacent and above the other of said hand grips and adapted for rotation by the other thumb of said gunner for setting range into said sight.

2. A sighting station, as claimed in claim 1, further including a shaft journalled in said platform, means for actuating said shaft by and in accordance with the pivoting of said sight, a floating rotatable gear mounted concentrically with respect to said platform, means responsive to the rotation of said shaft for rotating said gear, a differential having one input driven in accordance with the rotation of said gear and the other input driven in accordance with the rotation of said platform, two position transmitters, means for positioning one of said transmitters from the output of said differential, and means for positioning the other of said transmitters in accordance with the position of said platform.

3. A sighting station for a remote gun turret comprising a platform rotatable in azimuth, a gun sight pivotally mounted on said platform for rotation in elevation, a pair of diametrically opposed handles fixed to said platform for turning it in azimuth, an elevation knob coaxially mounted on one of said handles, means actuated by said knob for rotating said gun sight in elevation, a range knob coaxially mounted on the other of said handles, and means actuated by said range knob for setting range into said gun sight.

4. A sighting station having an arrangement for controlling a gun turret remote therefrom, said station comprising means for supporting a sight for movement about two intersecting axes for azimuth and elevation movement thereof for target tracking, the sight being a computing gun sight in which the computing mechanism is actuated by movement of the sight when tracking a target to effect relative angular displacement of the line of sight with respect to the angular position of the sight about said axes in accordance with computed lead angles whereby the position of the sight is equivalent to that required for aiming a gun to direct a projectile at a target, and circuit means for reproducing angular motion at a distance coupled with the sight for effecting a corresponding displacement of the gun turret.

5. A sighting station having an arrangement for controlling a gun turret remote therefrom by a single operator, said station comprising a sight support including members manually movable for orienting the sight in azimuth and elevation for target tracking purposes, a computing gun sight disposed in said support for movement by said members, the sight being of the type which has a computing mechanism actuated by movement of the sight when tracking a target to effect relative displacement between the line of sight and said members in accordance with computed lead angles, and transmission means controlled by the members when orienting the sight for displacing the turret in accordance with their position.

6. A sighting station adapted for one man operation for controlling a gun turret remote therefrom, the sighting station comprising a computing gun sight of the disturbed type having a pair of handgrips for moving the sight for target tracking purposes, the computing mechanism of the sight being effective when a target is tracked to cause relative displacement of the line of sight with respect to the handgrips according to computed lead angles, and transmitting means operated by the movement of the handgrips in tracking a target for effecting a corresponding movement of the turret.

7. In a sighting station for operating an aircraft gun turret by remote control including a computing gun sight, and supporting means therefore wherein the sight is movable for target tracking purposes, the gun sight being of the disturbed type wherein the computing mechanism of the sight is actuated by movement thereof in its support when tracking a target to compute lead angles to displace the line of sight with reference to the support, the improvement which comprises a manually operable member included in the support means for positioning the sight in azimuth whereby the member and line of sight are relatively displaced by the computing mechanism in accordance with the azimuth lead angle, and transmitting means controlled by the member for transmitting azimuth gun angle data to the turret for the purpose of controlling the position thereof in azimuth.

8. A sighting station according to claim 5, in which a manually movable member for orienting the sight in azimuth is mounted for rotation about a vertical axis and in which, during target tracking, the relative angular positions in azimuth of the member and the line of sight differ by the computed lead angle, the angular position of the member corresponding to the required angular position of a gun in azimuth for a projectile to strike the target.

9. A sighting station according to claim 6 in which gun firing and range controls are so disposed with respect to the handgrips that these controls may be operated as required along with the handgrips by a single operator.

10. A sighting station for remote aircraft gun turrets comprising a disturbed computing gun sight, a platform manually rotatable about an axis normal thereto, means for pivotally mounting said sight on said platform for rotation about an axis perpendicular to the axis of rotation of said platform, a pair of radially extending diametrically opposed handles on said platform for directly rotating said platform, means comprising a rotatable knob concentrically positioned on one of said handles for directly pivoting said sight with respect to said platform, a shaft journalled in said platform, means connected to said knob for actuating said shaft in accordance with the pivoting of said sight, a floating rotatable gear coaxially mounted with the axis of said platform, means responsive to the rotation of said shaft for rotating said gear, a differential having one input driven in accordance with the rotation of said gear and the other input driven in accordance with the rotation of said platform, two position transmitters, means for positioning one of said transmitters from the output of said differential, and means for positioning the other of said transmitters in accordance with the position of said platform.

11. A sighting station, as claimed in claim 10, further including a second knob concentrically and rotatably positioned on the other of said handles, and means responsive to the rotation of said second knob for setting range into said sight.

CARL G. HOLSCHUH.
DAVID FRAM.

REFERENCES CITED

The following references are of record in the file of this patent:

UNITED STATES PATENTS

| Number | Name | Date |
| --- | --- | --- |
| 1,531,132 | Radford | Mar. 24, 1925 |
| 1,532,754 | Kaminski | Apr. 7, 1925 |
| 1,687,551 | Ellis et al. | Oct. 16, 1928 |
| 1,859,725 | Vandenburg | May 24, 1932 |
| 2,399,726 | Doyle | May 7, 1946 |
| 2,405,028 | Ford | July 30, 1946 |
| 2,405,052 | Poitras et al. | July 30, 1946 |
| 2,407,665 | Halschuh et al. | Sept. 17, 1946 |
| 2,410,016 | Crooke | Oct. 29, 1946 |

FOREIGN PATENTS

| Number | Country | Date |
| --- | --- | --- |
| 422,099 | Great Britain | Jan. 3, 1935 |
| 482,325 | Great Britain | Mar. 28, 1938 |
| 489,059 | Great Britain | July 19, 1938 |
| 497,386 | Germany | May 9, 1930 |
| 515,993 | Great Britain | Jan. 29, 1937 |
| 673,342 | France | Oct. 7, 1929 |
| 752,856 | France | July 31, 1933 |
| 798,816 | France | Mar. 11, 1936 |